US009838239B2

(12) United States Patent
Chen et al.

(10) Patent No.: US 9,838,239 B2
(45) Date of Patent: Dec. 5, 2017

(54) DIGITAL GENERATION OF MULTI-LEVEL PHASE SHIFTING WITH A MACH-ZEHNDER MODULATOR (MZM)

(71) Applicant: Futurewei Technologies, Inc., Plano, TX (US)

(72) Inventors: Morgan Chen, San Jose, CA (US); Qianfan Xu, San Jose, CA (US); Hungyi Lee, Cupertino, CA (US); Yifan Gu, Santa Clara, CA (US); Liang Gu, San Jose, CA (US); Yen Dang, San Jose, CA (US); Gong Lei, Sunnyvale, CA (US); Yuming Cao, Pleasanton, CA (US); Xiao Shen, San Bruno, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/989,966

(22) Filed: Jan. 7, 2016

(65) Prior Publication Data

US 2016/0218811 A1 Jul. 28, 2016

Related U.S. Application Data

(60) Provisional application No. 62/106,512, filed on Jan. 22, 2015.

(51) Int. Cl.
*H04B 10/00* (2013.01)
*H04L 27/36* (2006.01)
(Continued)

(52) U.S. Cl.
CPC ....... *H04L 27/362* (2013.01); *H04B 10/5053* (2013.01); *H04B 10/5561* (2013.01)

(58) Field of Classification Search
CPC .............. H04L 27/362; H04B 10/5053; H04B 10/5561
See application file for complete search history.

(56) References Cited

U.S. PATENT DOCUMENTS 5,323,406 A * 6/1994 Yee .......................... G02F 1/225
372/26
7,450,787 B2 * 11/2008 Kucharski ............... G02F 1/025
385/2

(Continued)

FOREIGN PATENT DOCUMENTS

CN 103095379 A 5/2013

OTHER PUBLICATIONS

De Dobbelaere, "Silicon Photonics Technology Platform for Integration of Optical IOS with ADICs," www.luxtera.com, Aug. 26, 2013, 18 pgs.

(Continued)

*Primary Examiner* — Danny Leung
(74) *Attorney, Agent, or Firm* — Conley Rose, P.C.

(57) ABSTRACT

An apparatus comprising a first electrical driver configured to generate a first binary voltage signal according to first data, a second electrical driver configured to generate a second binary voltage signal according to second data, wherein the first data and the second data are different, and a first optical waveguide arm coupled to the first electrical driver and the second electrical driver, wherein the first optical waveguide arm is configured to shift a first phase of a first optical signal propagating along the first optical waveguide arm according to a first voltage difference between the first binary voltage signal and the second binary voltage signal to produce a first multi-level phase-shifted optical signal.

20 Claims, 17 Drawing Sheets

(51) Int. Cl.
  *H04B 10/556* (2013.01)
  *H04B 10/50* (2013.01)

(56) References Cited

U.S. PATENT DOCUMENTS

| | | | | |
|---|---|---|---|---|
| 7,515,775 B1* | 4/2009 | Kucharski | G02F 1/025 | 385/1 |
| 8,204,386 B2* | 6/2012 | Mahgerefteh | H04B 10/5162 | 398/183 |
| 2003/0030874 A1* | 2/2003 | Glingener | H04B 10/505 | 398/183 |
| 2003/0198478 A1* | 10/2003 | Vrazel | H04B 10/505 | 398/183 |
| 2004/0021829 A1* | 2/2004 | Griffin | H04B 10/505 | 353/30 |
| 2004/0081470 A1* | 4/2004 | Griffin | H04L 25/03343 | 398/188 |
| 2005/0069330 A1* | 3/2005 | Kao | H04B 10/505 | 398/188 |
| 2007/0274731 A1* | 11/2007 | Boffi | H04B 10/505 | 398/188 |
| 2008/0170864 A1* | 7/2008 | Nishihara | H04B 10/548 | 398/188 |
| 2009/0086303 A1* | 4/2009 | Ide | H04B 10/5561 | 359/279 |
| 2009/0141333 A1* | 6/2009 | Tsunoda | G02F 1/0123 | 359/279 |
| 2009/0244685 A1* | 10/2009 | Hoshida | G02F 1/0123 | 359/279 |
| 2009/0324253 A1* | 12/2009 | Winzer | H04B 10/505 | 398/185 |
| 2010/0202785 A1* | 8/2010 | Kawanishi | H04B 10/505 | 398/185 |
| 2012/0281988 A1* | 11/2012 | Kikuchi | H04B 10/5561 | 398/159 |
| 2013/0202312 A1* | 8/2013 | Shen | H04B 10/5053 | 398/138 |
| 2014/0363175 A1* | 12/2014 | Yamanaka | H04B 10/5053 | 398/183 |
| 2015/0132007 A1* | 5/2015 | Zheng | H04B 10/2575 | 398/135 |
| 2015/0295649 A1* | 10/2015 | Peng | H04B 10/541 | 398/147 |
| 2016/0218811 A1* | 7/2016 | Chen | H04B 10/5561 | |

OTHER PUBLICATIONS

Foreign Communication From a Counterpart Application, PCT Application No. PCT/CN2016/071337, English Translation of International Search Report dated Mar. 28, 2016, 7 pages.

Foreign Communication From a Counterpart Application, PCT Application No. PCT/CN2016/071337, English Translation of Written Opinion dated Mar. 28, 2016, 4 pages.

* cited by examiner

DIGITAL GENERATION OF MULTI-LEVEL PHASE SHIFTING WITH A MACH-ZEHNDER MODULATOR (MZM)

CROSS-REFERENCE TO RELATED APPLICATIONS

The present application claims priority to U.S. Provisional Patent Application 62/106,512, filed Jan. 22, 2015 by Morgan Chen, et al., and entitled "Digital Generation of Multi-Level Phase Shifting with a Mach-Zehnder Modulator (MZM)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical fibers have been widely used for providing high-speed communication links. Optical links employing optical fibers provide many advantages compared to electrical links. These advantages include large bandwidth, high noise immunity, reduced power dissipation, and reduced crosstalk. In communication systems or networks where optical fibers are used to transport optical communication signals, various optoelectronic devices are used to control, modify, and process the optical signals.

SUMMARY

In one embodiment, the disclosure includes an apparatus comprising a first electrical driver configured to generate a first binary voltage signal according to first data, a second electrical driver configured to generate a second binary voltage signal according to second data, wherein the first data and the second data are different, and a first optical waveguide arm coupled to the first electrical driver and the second electrical driver wherein the first optical waveguide arm is configured to shift a first phase of a first optical signal propagating along the first optical waveguide arm according to a first voltage difference between the first binary voltage signal and the second binary voltage signal to produce a first multi-level phase-shifted optical signal. In some embodiments, the disclosure also includes the first electrical driver further configured to provide a first voltage swing for the first binary voltage signal, wherein the second electrical driver is further configured to provide a second voltage swing for the second binary voltage signal, wherein the first voltage swing is different from the second voltage swing, and wherein the first multi-level phase-shifted optical signal comprises at least four signal levels, and/or further comprising a level shifter coupled to the first electrical driver and configured to shift voltage levels of the first binary voltage signal so that the first voltage difference comprises at least four voltage steps, and/or wherein the first electrical driver and the second electrical driver are complementary metal-oxide semiconductor (CMOS) drivers, and/or wherein the first binary voltage signal and the second binary voltage signal comprise synchronized bit transitions, and/or wherein the first optical waveguide arm comprises a plurality of segments along an optical path, wherein the first electrical driver and the second electrical driver are positioned at a first segment of the plurality of segments, wherein the apparatus further comprises a third electrical driver coupled to the first optical waveguide arm at a second segment of the plurality of segments, wherein the third electrical driver is configured to generate a third binary voltage signal according to third data, and a fourth electrical driver coupled to the first optical waveguide arm at the second segment, wherein the fourth electrical driver is configured to generate a fourth binary voltage signal according to fourth data, wherein the first data, the second data, the third data, and the fourth data are different, and wherein the first optical waveguide arm is further configured to shift the first phase according to a second voltage difference between the third binary voltage signal and the fourth binary voltage signal, and/or the first optical waveguide arm comprises a plurality of segments along an optical path, wherein the first electrical driver and the second electrical driver are positioned at a first segment of the plurality of segments, wherein the apparatus further comprises a third electrical driver coupled to the first optical waveguide arm at a second segment of the plurality of segments, wherein the third electrical driver is configured to generate a third binary voltage signal according to the first data after a delay, and a fourth electrical driver coupled to the first optical waveguide arm at the second segment, wherein the fourth electrical driver is configured to generate a fourth binary voltage signal according to the second data after the delay, and wherein the first optical waveguide arm is further configured to shift the first phase according to a second voltage difference between the third binary voltage signal and the fourth binary voltage signal, and/or further comprising a first Mach-Zehnder modulator (MZM), wherein the first electrical driver, the second electrical driver, and the first optical waveguide arm are part of the first MZM, and/or wherein the first MZM further comprises a first optical splitter coupled to the first optical waveguide arm and configured to split a third optical signal into the first optical signal and a second optical signal, a second optical waveguide arm coupled to the first optical splitter and configured to shift a second phase of the second optical signal according to an inverse of the first data and an inverse of the second data to produce a second multi-level phase-shifted optical signal, and a first optical combiner coupled to the first optical waveguide arm and the second optical waveguide arm and configured to combine the first multi-level phase shifted optical signal and the second multi-level phase-shifted optical signal to produce a first pulse-amplitude modulation (PAM) signal comprising at least four levels, and/or further comprising an in-phase quadrature-phase (IQ) modulator, wherein the first MZM is part of the IQ modulator, and wherein the first PAM signal corresponds to an in-phase (I) component, and/or wherein the IQ modulator further comprises a second optical splitter coupled to the first MZM and configured to split a fourth optical signal into the third optical signal and a fifth optical signal, a second MZM coupled to the second optical splitter, wherein the second MZM is configured to modulate the fifth optical signal according to third data and fourth data to produce a second PAM optical signal, a phase shifter coupled to the second MZM and configured to shift a phase of the second PAM optical signal by pi ($\pi$)/2 radians to produce a quadrature-phase (Q) component, and a second optical combiner coupled to the first MZM and the phase shifter, wherein the second optical combiner is configured to combine the I component and the Q component to produce a first 16 quadrature-amplitude modulation (16QAM) signal.

In another embodiment, the disclosure includes a method comprising generating a first digital electrical signal according to first data, generating a second digital electrical signal according to second data, wherein the first data and the second data are different data, and modulating a first phase of a first optical signal propagating along a first optical waveguide arm according to a first voltage difference between the first electrical signal and the second digital electrical signal to produce a first multi-level phase-modulated signal comprising at least four levels. In some embodiments, the disclosure also includes shifting voltage levels of at least the first digital electrical signal on that the first voltage difference comprises staggered voltage steps, and/or applying the first electrical signal and the second electrical signal across a first electrical junction of the first optical waveguide arm, and/or generating a third digital electrical signal according to third data, and/or generating a fourth digital electrical signal according to fourth data, and/or applying the third electrical signal and the fourth electrical signal across a second electrical junction of the first optical waveguide arm, and/or further modulating the first phase according to a second voltage difference between the third electrical signal and the fourth digital electrical signal, wherein the first data, the second data, the third data, and the fourth data are different data, and/or applying the first electrical signal and the second electrical signal across a first electrical junction of the first optical waveguide arm, and/or generating a third digital electrical signal according to the first data after a delay, and/or generating a fourth digital electrical signal according to second data after the delay, and/or applying the third electrical signal and the fourth electrical signal across a second electrical junction of the first optical waveguide arm, and/or further modulating the first phase of the first optical signal according to a second voltage difference between the third electrical signal and the fourth digital electrical signal, and/or generating a third digital electrical signal according to an inverse of the first data, and/or generating a fourth digital electrical signal according to an inverse of the fourth data, and/or modulating a second phase of a second optical signal propagating along a second optical waveguide arm according to a second voltage difference between the third electrical signal and the fourth digital electrical signal to produce a second multi-level phase-modulated signal, and combining the first multi-level phase-modulated signal and the second multi-level phase modulated signal to produce a four-level pulse-amplitude modulation (PAM-4) signal.

In yet another embodiment, the disclosure includes an apparatus comprising a Mach-Zehnder interferometer (MZI) arm comprising an electrical junction, wherein the electrical junction comprises a first terminal and a second terminal, a first CMOS driver coupled to the first terminal and configured to provide a first output voltage swing, and a second CMOS driver coupled to the second terminal and configured to provide a second output voltage swing, wherein the first output voltage swing and the second output voltage swing are different, and wherein a voltage difference across the first terminal and the second terminal comprises at least four voltage steps. In some embodiments, the disclosure also includes that the first output voltage swing is between a first voltage level and a second voltage level, wherein the apparatus further comprises a voltage level-shifting element positioned between the first CMOS driver and the first terminal, and wherein the voltage level-shifting element is configured to shift the first voltage level and the second voltage level to higher voltage levels, and/or the first terminal corresponds to a negative terminal of the electrical junction and the second terminal corresponds to a positive terminal of the electrical junction so that the electrical junction is configured to have a reverse bias, and/or wherein the first CMOS driver is further configured to receive a first input voltage greater than a first breakdown voltage of the first CMOS driver, wherein the second CMOS driver is further configured to receive a second input voltage greater than a second breakdown voltage of the second CMOS driver, and wherein the voltage difference is greater than the first input voltage and the second input voltage.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
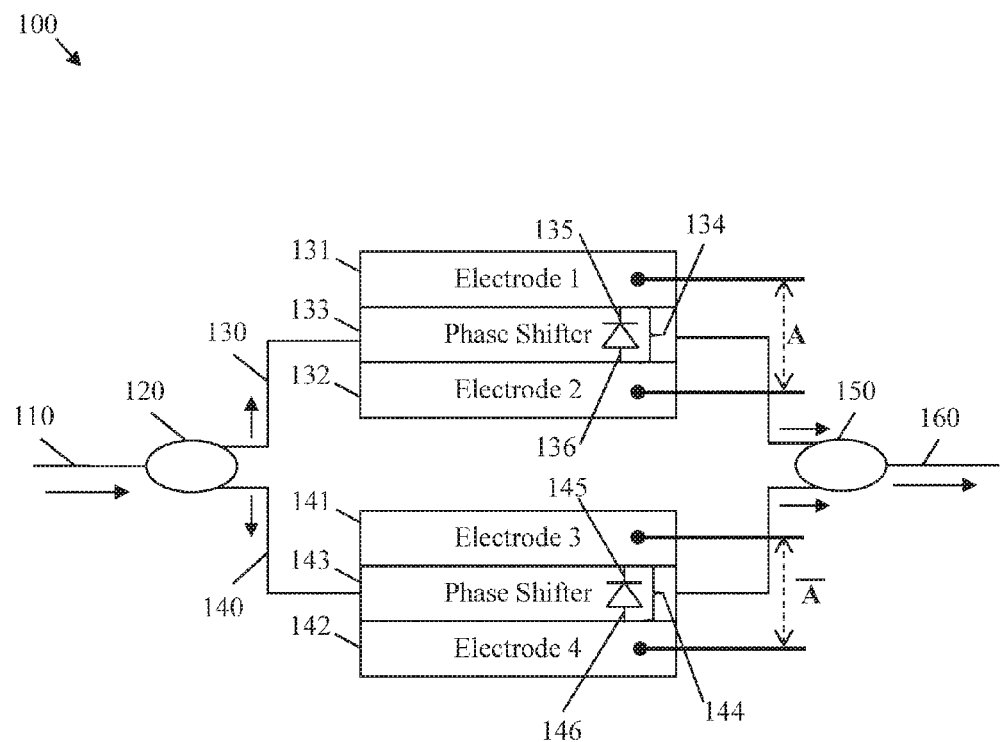
FIG. 1 is a schematic diagram of a silicon MZM.

FIG. 1 is a schematic diagram of a silicon MZM 100. The MZM 100 is an electro-optical (EO) modulator based on MZIs. The MZM 100 is employed for converting electrical signals into optical signals for transmission in an optical communication system. The MZM 100 comprises a pair of MZI arms 130, 140 coupled between an input optical waveguide 110 and an output optical waveguide 160 via an optical splitter 120 and an optical combiner 150, respectively. The solid arrows show a direction of optical signal propagation. The optical splitter 120 and the optical combiner 150 may be any optical couplers such as 3 decibel (dB) couplers, directional couplers, and multi-mode interference (MMI) couplers. The MZI arm 130 comprises an electrical junction 134 such as a PN junction or a metal-oxide semiconductor (MOS) capacitor junction. When a voltage is applied across the electrical junction 134, a phase shift is induced in an optical signal travelling through the MZI arm 130, forming a phase shifter 133 at the MZI arm 130. To control the electrical field across the electrical junction 134, a pair of electrodes 131, 132 is connected to the electrical junction 134 of the MZI arm 130 at a negative terminal 135 and a positive terminal 136, respectively. Typically, one of the electrodes 131, 132 is also connected to ground. The MZI arm 140 is similar to the MZI arm 130. A phase shifter 143 is formed at an electrical junction 144 of the MZI arm 140. A pair of electrodes 141, 142 is connected to the electrical junction 144 of the MZI arm 140 at a negative terminal 145 and a positive terminal 146, respectively.

In operation, the input optical waveguide 110 is configured to receive an optical signal. For example, the optical signal may be generated from a light source such as a continuous wave (CW) laser. The optical splitter 120 splits the optical signal into a first portion and a second portion. The optical splitter 120 couples the first optical signal portion into the MZI arm 130 and the second optical signal portion into the WI arm 140. A digital electrical signal, represented as A, is applied across the electrodes 131 and 132 at the MZI arm 130. The phase shifter 133 modulates the phase of the first optical signal portion according to the digital electrical signal A to produce a first phase-modulated or phase-shifted optical signal. For example, the digital electrical signal A is a binary voltage signal comprising two voltage levels, one representing a binary digit of 1 and another representing a binary digit of 0. Each voltage level causes the phase shifter 133 to generate a particular phase shift. The inverse, or the complement, of the digital electrical signal A, represented as $\overline{A}$, is applied to the other MZI arm 140 across the electrodes 141 and 142. The dashed arrows show electrical signal flow direction. The phase shifter 143 modulates the second optical signal portion according to the digital electrical signal $\overline{A}$ to produce a second phase-modulated or phase-shifted optical signal.

The optical combiner 150 combines the first phase-shifted optical signal and the second phase-shifted optical signal to produce a modulated optical signal at the output optical waveguide 160. The application of digital electrical signals of opposite polarities to the MZI arms 130, 140 is referred to as a push-pull configuration, and the MZI arm 140 is referred to as a complementary MZI arm. The push-pull configuration allows for an increased modulation depth, which may provide an increased phase swing, an increased output power, and a higher extinction ratio (ER). Extinction ratio refers to a ratio of two optical power levels of a digital signal generated by an optical source such as a laser diode. In addition, a push-pull MZM may employ shorter MZI arms, which may reduce the footprint of the MZM.

MZMs such as the MZM 100 may be configured in various configurations. The rapid growth of optical networks and the need for greater capacity has led research and industry to explore the MZM structure for building high-speed and high-order modulators. One common approach to providing high-order modulation such as n-level quadrature-amplitude modulation (nQAM) is to employ multiple MZMs. Another common approach is to segment a single MZM into a series of modulator segments. U.S. Pat. No. 7,450,787 to Daniel Kucharski, et al., which is incorporated by reference, describes distributed amplified modulators with one electrical driver per modulator segment to achieve high-speed modulation. U.S. Pat. No. 7,515,775 to Daniel Kucharski, et al., which is incorporated by reference, describes the employment of complementary devices for distributed modulator drivers. Peter De Dobbelaere, "Silicon Photonics Technology Platform for Integration of Optical IOs with ASICs," Aug. 26, 2013, which is incorporated by reference, describes a multi-level modulation scheme using multiple optical segments of different lengths to improve performance. U.S. patent application Ser. No. 14/075,882 titled "Digital Optical Modulator for Programmable N-Quadrature Amplitude Modulation Generation," which is incorporated by reference, describes optical techniques for QAM. Some other MZMs provide high-order modulation by driving the MZMs with multi-level electrical driver signals. For example, in the MZM 100, the electrode 131 is driven by a multi-level analog electrical driver signal and the electrode 132 is connected to ground. However, the generation of the multi-level analog electrical driver signal requires external devices such as digital-to-analog converters (DACs), attenuators, and digital signal processors (DSPs), and thus the power consumption may be high and the footprint may be large.

Disclosed herein are embodiments for providing multi-level phase shifts at a single MZI arm segment without employing a DAC. In contrast to the approaches described above, the disclosed embodiments drive a single MZI arm segment with two separate data streams instead of a single data stream and employ a pair of CMOS drivers with different voltage swings to drive the MZI arm segment. For example, a first CMOS driver and a second CMOS driver are coupled at a negative terminal and a positive terminal of an electrical junction of an MZI arm segment, respectively. The first CMOS driver generates a first binary voltage signal according to a first data stream. The second CMOS driver generates a second binary voltage signal according to a second data stream. The first data stream and the second data stream are uncorrelated, but bit transitions are synchronized. By assigning appropriate voltage rails to the CMOS drivers and employing a level shifter at the output of at least one of the CMOS drivers, multi-level modulation voltages are generated across the MZI arm segment. Thus, the MZI arm segment operating as a phase shifter generates multi-level phase shifts according to the multi-level modulation voltages. By synchronously modulating two separate data streams onto the phase of an optical signal, the output data rate is twice the input data rate. The employment of the level shifter also enables the CMOS drivers to be driven by low-input voltages as limited by device breakdown, but yet produces high modulation voltages. The disclosed embodiments are suitable for use in push-pull MZMs to increase modulation depth. The disclosed embodiments may be extended to employ multiple segments to provide higher output data rates or higher output bandwidth. The disclosed embodiments are compatible with other optical techniques that generate advanced modulation formats such as nQAM, n-level pulse-amplitude modulation (nPAM), and DP-16QAM. The disclosed embodiments provide various benefits such as lower optical loss, lower power consumption, a smaller footprint, and higher performance when compared to the approaches described above.

Figure 2:
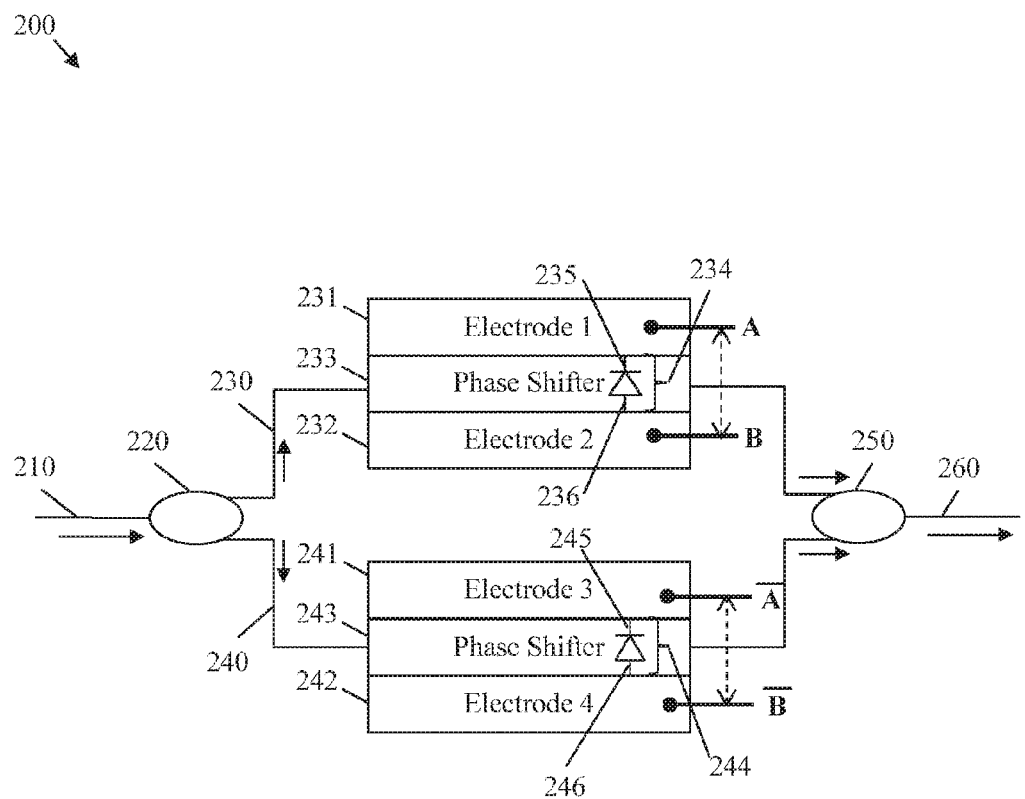
FIG. 2 is a schematic diagram of a silicon MZM that digitally generates multi-level phase shifts according to an embodiment of the disclosure.

FIG. 2 is a schematic diagram of a silicon MZM 200 that digitally generates multi-level phase shifts according to an embodiment of the disclosure. The MZM 200 comprises a pair of MZI arms 230, 240 coupled between an input optical waveguide 210 and an output optical waveguide 260 via an optical splitter 220 and an optical combiner 250, respectively. The optical splitter 220 and the optical combiner 250 are similar to the optical splitter 120 and optical combiner 150, respectively. The solid arrows show a direction of optical signal propagation. A pair of electrodes 231, 232 is connected to an electrical junction 234 of the NM arm 230 at a negative terminal 235 and a positive terminal 236, respectively, forming a phase shifter 233. Similarly, a pair of electrodes 241, 242 is connected to an electrical junction 244 of the MZI arm 240 at a negative terminal 245 and a positive terminal 246, respectively, forming a phase shifter 243.

In contrast to the MZM 100, digital electrical signals corresponding to separate data streams are applied to each of the MZI arms 230 and 240. In addition, the two digital electrical signals are configured to produce different voltage swings, allowing them to represent binary digits with different significance as described more fully below. Thus, each of the MZI arms 230 and 240 produces phase-modulated signals comprising four distinctive levels, each representing a two-digit binary number.

As shown, digital electrical signals, represented as A and B, are applied to the MZI arm 230 at the electrodes 231 and 232, respectively. The dashed arrows show electrical s flow direction. The complements of the digital electrical signals A and B, represented as A and $\overline{B}$, are applied to the other MZI arm 240 at the electrodes 241 and 242, respectively. The digital electrical signals A, B, $\overline{A}$, and $\overline{B}$ are binary voltage signals and may be single-ended signals or differential signals. Depending on the sign of the bias voltages across the electrical junction, the electrical junction may be under forward bias or reverse bias. In order to achieve high-speed modulation, the electrical junctions at both of the MZI arms 230 and 240 are required to operate under reverse-bias. Level shifters may be used to offset voltages at the electrodes 231, 232, 241, and 242 as described more fully below.

By modulating the two data streams simultaneously and synchronously onto an optical carrier signal, the MZM 200 produces a phase-modulated optical signal at twice the data bit rate of the data streams. For example, each data stream is clocked at a bit rate of K, the phase-modulated optical signal comprises a baud rate of R and a bit rate of 2×R. Synchronous refers to the two data streams comprising bit transitions at the same time. For example, a signal synchronization unit may be employed to synchronize the bit transitions of the digital electrical signals, A and B. In some embodiments, the MZM arm 240 inlay be driven by different digital electrical signals such as a signal C and a signal D with different voltage swings instead of A and to further increase bit rate.

Figure 3:
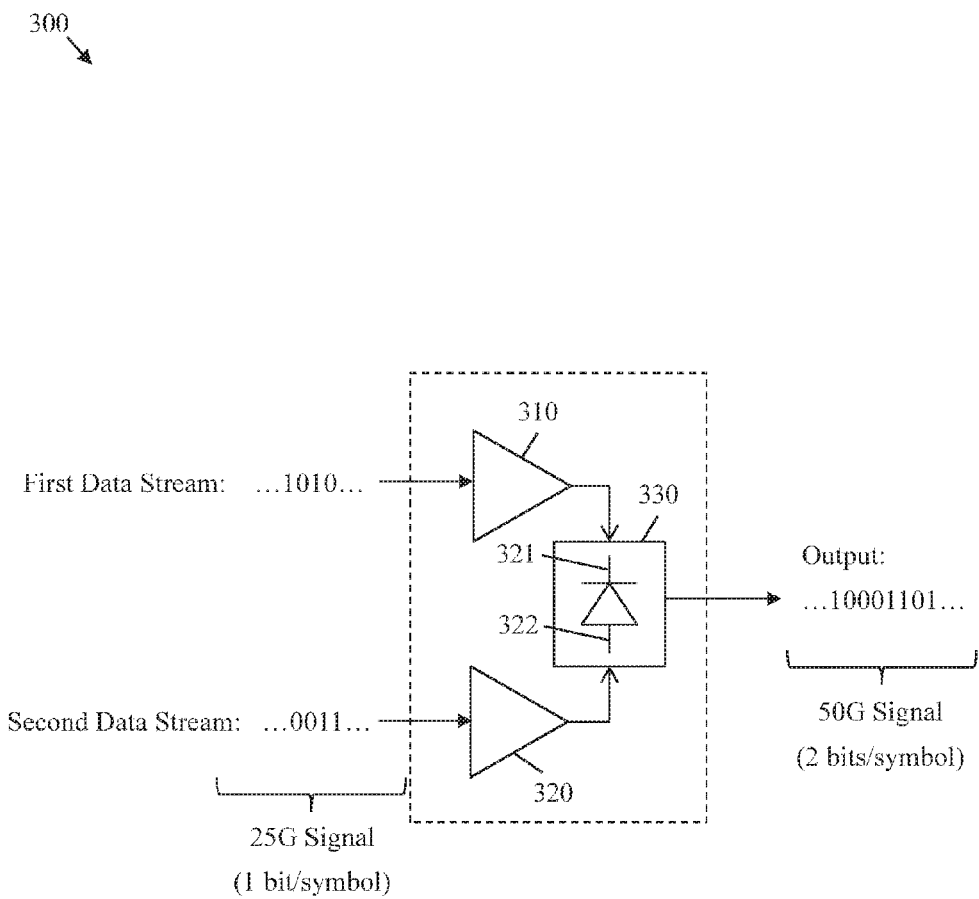
FIG. 3 is a schematic diagram of a modulator driver section according to an embodiment of the disclosure.

FIG. 3 is a schematic diagram of a modulator driver section 300 according to an embodiment of the disclosure. The MZM driver section 300 is employed for driving a single segment of an MZM arm such as the MZI arms 230 and 240. The MZM driver section 300 comprises a pair of CMOS drivers 310, 320 coupled across a PN junction 330 at a negative terminal 321 and a positive terminal 322, respectively. The PN junction 330 represents an electrical junction at a single MZI arm. The PN junction 330 is similar to the electrical junctions 134, 144, 234, and 244. The negative terminal 321 is similar to the negative terminals 135, 145, 235, and 245. The positive terminal 322 is similar to the positive terminals 136, 146, 236, and 246. The CMOS driver 310 is configured to receive a first data stream and generate a first binary electrical signal according to the first data stream. The CMOS driver 320 is configured to receive a second data stream and generate a second binary electrical signal according to the second data stream. The first data stream and the second data stream are uncorrelated and may correspond to separate data channels. By assigning appropriate voltage rails to the CMOS drivers 310 and 320, multi-level modulation voltages are generated across the PN junction 330 without employing a DAC as described more fully below. Each modulation voltage step represents two data bits, one bit from the first data stream and another bit from the second data stream. The application of the modulation voltages across the PN junction 330 induces a phase shift in an optical signal travelling through the PN junction 330. For example, when the first data stream and the second data stream are 25 gigabit (Gb) signals, two data bits are modulated at a time to produce a modulation symbol. Thus, the modulated optical signal comprises a baud of 25 gigabaud (GBd), but a data bit rate of 50 gigabits per second (Gbps).

Figure 4A:
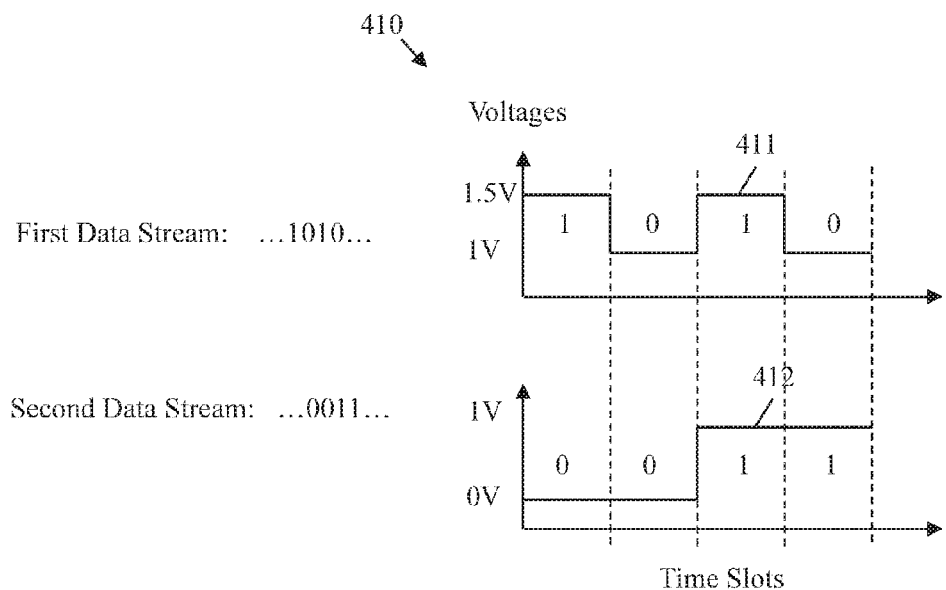
FIG. 4A is a graph illustrating terminal voltages at a positive-negative (PN) junction of a modulator driver section according to an embodiment of the disclosure.

FIGS. 4A-D illustrate various voltage configurations for generating multi-level modulation voltages by employing the modulator driver section 300 without a DAC. The x-axis represents time slots in some constant units of time. Each time slot corresponds to the duration of a data bit. The y-axis represents voltages in units of volts. FIG. 4A is a graph 410 illustrating terminal voltages at the PN junction 330 of the modulator driver section 300 according to an embodiment of the disclosure. The waveform 411 shows the terminal voltages at the negative terminal 321, which swings from 1 volt (V) to 1.5 V. For example, 1 V corresponds to a bit-value of 0 in the first data stream and 1.5 V corresponds to a bit-value of 1 in the first data stream. The waveform 412 shows the terminal voltages at the positive terminal 322, which swings from 0 V to 1 V. For example, 0 V corresponds to a bit-value of 0 in the second data stream and 1 V corresponds to a bit-value of 1 in the second data stream.

Figure 4B:
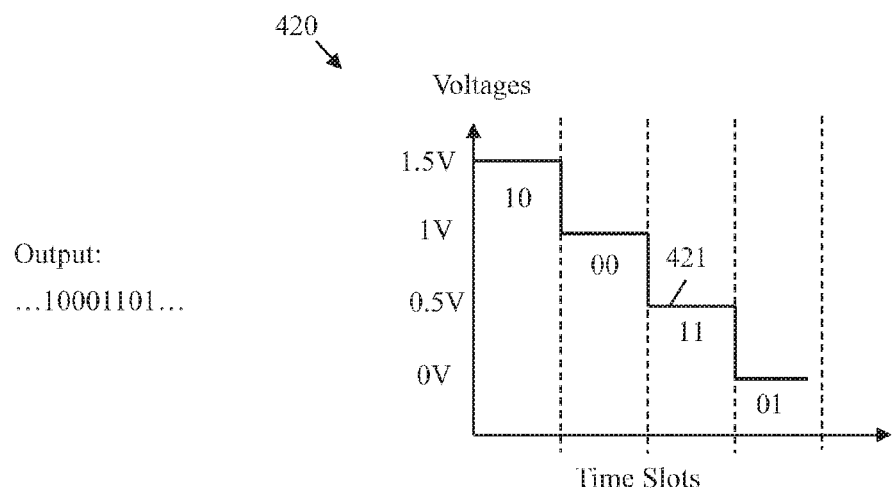
FIG. 4B is a graph illustrating modulation voltages generated by a modulator driver section according to an embodiment of the disclosure.

FIG. 4B is a graph 420 illustrating modulation voltages generated by the modulator driver section 300 according to an embodiment of the disclosure. The waveform 421 shows the modulation voltages across the PN junction 330 when the terminal voltages at the negative terminal 321 and the positive terminal 322 are as shown in the waveforms 411 and 412, respectively. In the waveform 421, voltage levels of 1.5 V, 1 V, 0.5 V, and 0 V correspond to binary values of 10, 00, 11, and 01, respectively. Thus, the signal at the negative terminal 321 comprising the higher amplitudes controls the higher significant binary digit, and the signal at the positive terminal 322 comprising the lower amplitudes controls the lower significant binary digit.

Figure 4C:
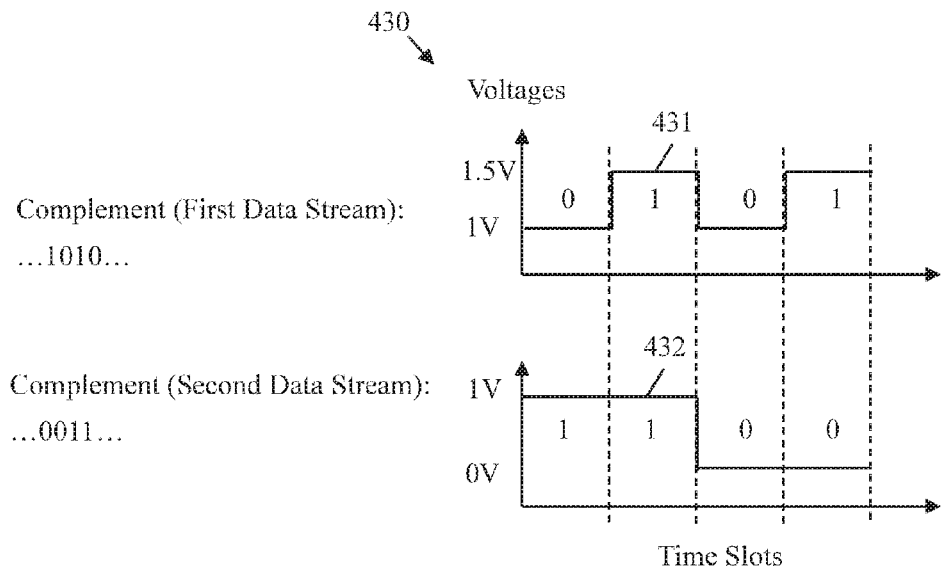
FIG. 4C is a graph illustrating terminal voltages at a PN junction of a modulator driver section according to another embodiment of the disclosure.

FIG. 4C is a graph 430 illustrating terminal voltages at the PN junction 330 of the modulator driver section 300 according to another embodiment of the disclosure. The waveforms 431 and 432 show the terminal voltages at the negative terminal 321 and the positive terminal 322, respectively. The waveforms 431 and 432 are the complements of the waveforms 411 and 412, respectively. For example, the waveforms 411 and 412 correspond to voltages applied across a single MZI arm segment such as the MZI arm 230 of an MZM and the waveforms 431 and 432 correspond to voltages applied across a corresponding complementary MZI arm segment such as the MZI arm 240 of the MZM.

Figure 4D:
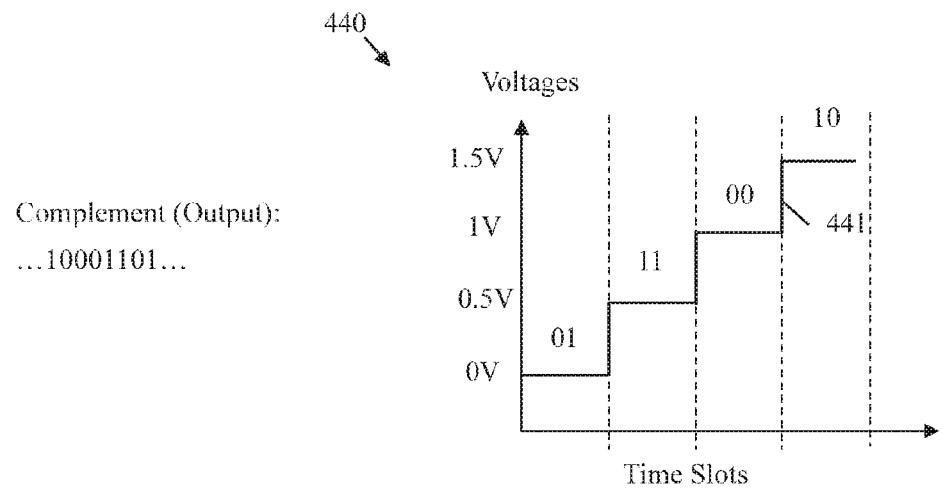
FIG. 4D is a graph illustrating modulation voltages generated by a modulator driver configuration according to another embodiment of the disclosure.

FIG. 4D is a graph 440 illustrating modulation voltages generated by the modulator driver section 300 according to another embodiment of the disclosure. The waveform 441 shows the modulation voltages across the PN junction 330 when the terminal voltages at the negative terminal 321 and the positive terminal 322 are as shown in the waveforms 431 and 432, respectively. For example, the waveform 421 corresponds to modulation voltages applied across a single MZI arm segment such as the MZI arm 230 of an MZM and the waveform 441 corresponds to modulation voltages applied across a corresponding complementary MZI arm segment such as the MZI arm 240 of the MZM.

In order to generate terminal voltages and modulation voltages as shown in FIGS. 4A-4D, the modulator driver section 300 may employ a level shifter at least at one of the negative terminal 321 and the positive terminal 322. CMOS devices are known to provide high toggle speed at the expense of low operating voltages due to breakdown limitations. Thus, the CMOS drivers 310 and 320 are required to operate at low voltages according to the device breakdown voltages of the CMOS drivers 310 and 320. However, higher modulation voltages provide better modulation performance and may allow for shorter MZI arm lengths. By employing a level shifter, the modulator driver section 300 allows the CMOS drivers 310 and 320 to operate at low input voltages, but yet produces high modulation voltages. As an example, the CMOS drivers 310 and 320 may comprise a device breakdown voltage close to 1 V. The CMOS driver 320 may be configured to operate at voltage rails of 0 V and 1 V to provide terminal voltages between 0 V and 1 V at the positive terminal 322. A level shifter may be employed to shift the output voltages of the CMOS driver 310 to provide terminal voltages between 1 V and 1.5 V at the negative terminal 322. Thus, by employing the level shifter, modulation voltages of 3 volts peak-to-peak ($V_{pp}$) is produced across the PN junction 330.

Such a modulation voltage generation mechanism may provide high power efficiency. The power consumption for each swing is proportional to $f \times c \times v^2$, where f is the switching frequency, c is the capacitance, and v is the voltage. Using attenuating elements may generate different voltage swings, but may result in reduced power efficiency.

Although the waveforms 421 and 441 show even modulation voltage steps, the steps may have staggered amounts. For instance, 0 V, 0.8 V, 1 V, and 1.8 V may be used instead of 0 V, 0.5 V, 1 V, and 1.5 V to provide modulation voltages of 3.6 $V_{pp}$. Thus, the modulation voltage steps may be selected according to the design of the MZM to provide modulation linearity. For example, 16-QAM generated by an MZM is known to comprise a non-linear quadrature response as the phase shift approaches 2 pi ($\pi$) radians. Thus, the modulation voltage steps may be selected to account for the non-linearity as described more fully below. In some embodiments, stacked transistors and other input/output (I/O) devices may be additionally employed to further increase modulation voltages.

Figure 5:
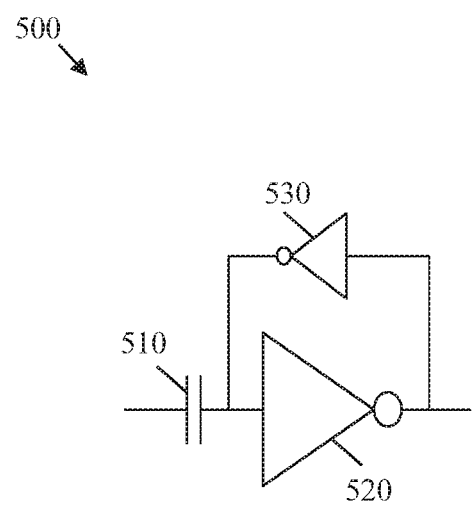
FIG. 5 is a schematic diagram of a level shifter according to an embodiment of the disclosure.

FIG. 5 is a schematic diagram of a level shifter 500 according to an embodiment of the disclosure. The level shifter 500 is employed by the modulator driver section 300 to generate high modulation voltages with low CMOS driver input voltages. For example, the level shifter 500 may be positioned between the output of the CMOS driver 310 and the negative terminal 321 of the PN junction 330 or between the output of the CMOS driver 320 and the positive terminal 322. The level shifter 500 comprises a direct current (DC) blocking capacitor 510 coupled to a gain element 520 and a feedback keeper element 530. The DC block capacitor 510 isolates the gain element 520 and the feedback keeper element 530 from other circuit stages such as the CMOS drivers 310 and 320. The gain element 520 and the keeper feedback element 530 may be any amplifiers such as CMOS inverter-based amplifiers.

Figure 6:
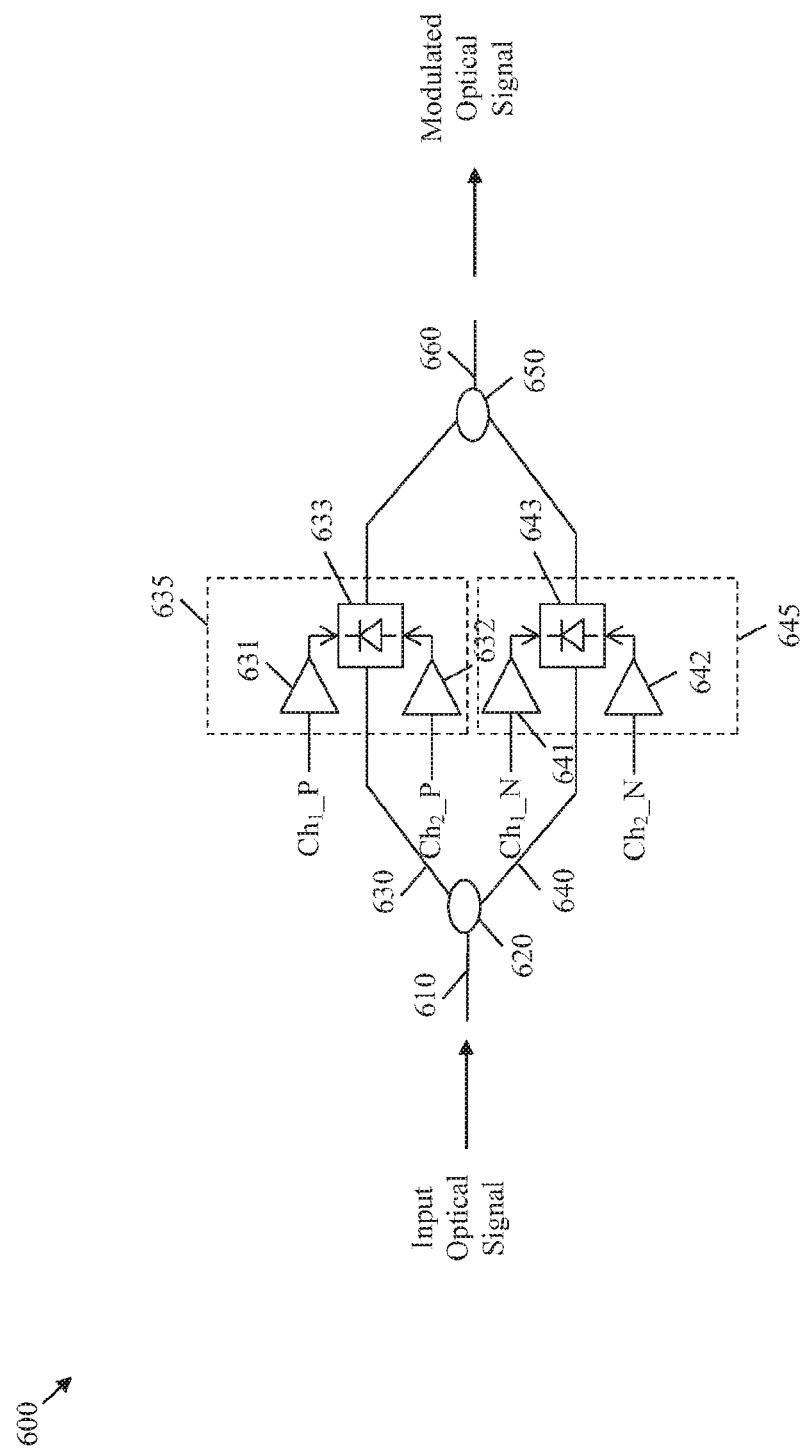
FIG. 6 is a schematic diagram of an MZM driven by CMOS drivers according to an embodiment of the disclosure.

FIG. 6 is a schematic diagram of an MZM 600 driven by CMOS drivers according to an embodiment of the disclosure. The MZM 600 is similar to the MZM 200 and employs the modulator driver section 300 to generate modulation signals. The MZM 600 comprises a pair of MZI arms 630, 640 coupled between an input waveguide 610 and an output waveguide 660 via an optical splitter 620 similar to the optical splitters 120 and 220 and an optical combiner 650 similar to the optical combiners 150 and 250, respectively. The MZI arms 630 and 640 are similar to the MZI arms 130, 140, 230, and 240. The input waveguide 610 and the output waveguides 660 are similar to the input waveguides 110 and 210 and the output waveguides 160 and 260. The MZI arms 630 and 640 are driven by modulator driver sections 635 and 645, respectively. The modulator driver section 635 and 645 are similar to the modulator driver section 300. The modulator driver section 635 comprises a pair of CMOS drivers 631, 632 coupled across an electrical junction 633 of the MZI arm 630. The modulator driver section 645 comprises a pair of CMOS drivers 641, 642 coupled across an electrical junction 643 of the MZI arm 640. The CMOS drivers 631, 632, 641, and 642 are similar to the CMOS drivers 310 and 320. The CMOS drivers 631 and 632 are driven by two separate channel data, shown as $Ch_1\_P$ and $Ch_2\_P$. The CMOS drivers 641 and 642 are driven by the inverse or complements of the channel data, shown as $Ch_1\_N$ and $Ch_2\_N$. With a low-voltage differential input applied among $Ch_1\_P$, $Ch_1\_N$, $Ch_2\_P$, and $Ch_2\_N$, the modulation signal may be equalized and boosted through CMOS inverters acting as limiting amplifiers. The input sensitivity may be as low as 50 millivolts peak-to-peak ($mV_{pp}$) per channel.

In operation, the input waveguide 610 is configured to receive an optical signal. The optical splitter 620 splits the optical signal into two portions and couples a first portion to the MZI arm 630 and a second portion to the MZI arm 640.

The modulator driver section 635 modulates the phase of the first optical signal portion propagating along the MZI arm 630 according to the channel data $Ch_1\_P$ and $Ch_2\_P$. The modulator driver section 645 modulates the phase of the second optical signal portion propagating along the MZI arm 640 according to the channel data $Ch_1\_N$ and $Ch_2\_N$. The optical combiner 650 combines the modulated first optical signal portion and the modulated second optical signal portion to produce a modulated optical signal at the output waveguide 660. The MZM 600 may employ a level shifter such as the level shifter 500 at each of the outputs of the CMOS driver 631 and 641 so that the electrical junctions 633 and 643 are under reverse bias, which may provide higher-speed modulation.

In an embodiment, the CMOS drivers 631, 632, 641, and 642 and the MZI arms 630 and 640 are co-designed to consider parameters such as optical index, optical loss, bias voltage-length product ($V_{pi}$-L), capacitance, and resistance. For a particular optical transmission link, the voltage swings and toggle speeds of the CMOS drivers 631, 632, 641, and 642 may determine parameters such as extinction ratio (ER) and data rate of the MZM 600.

Figure 7:
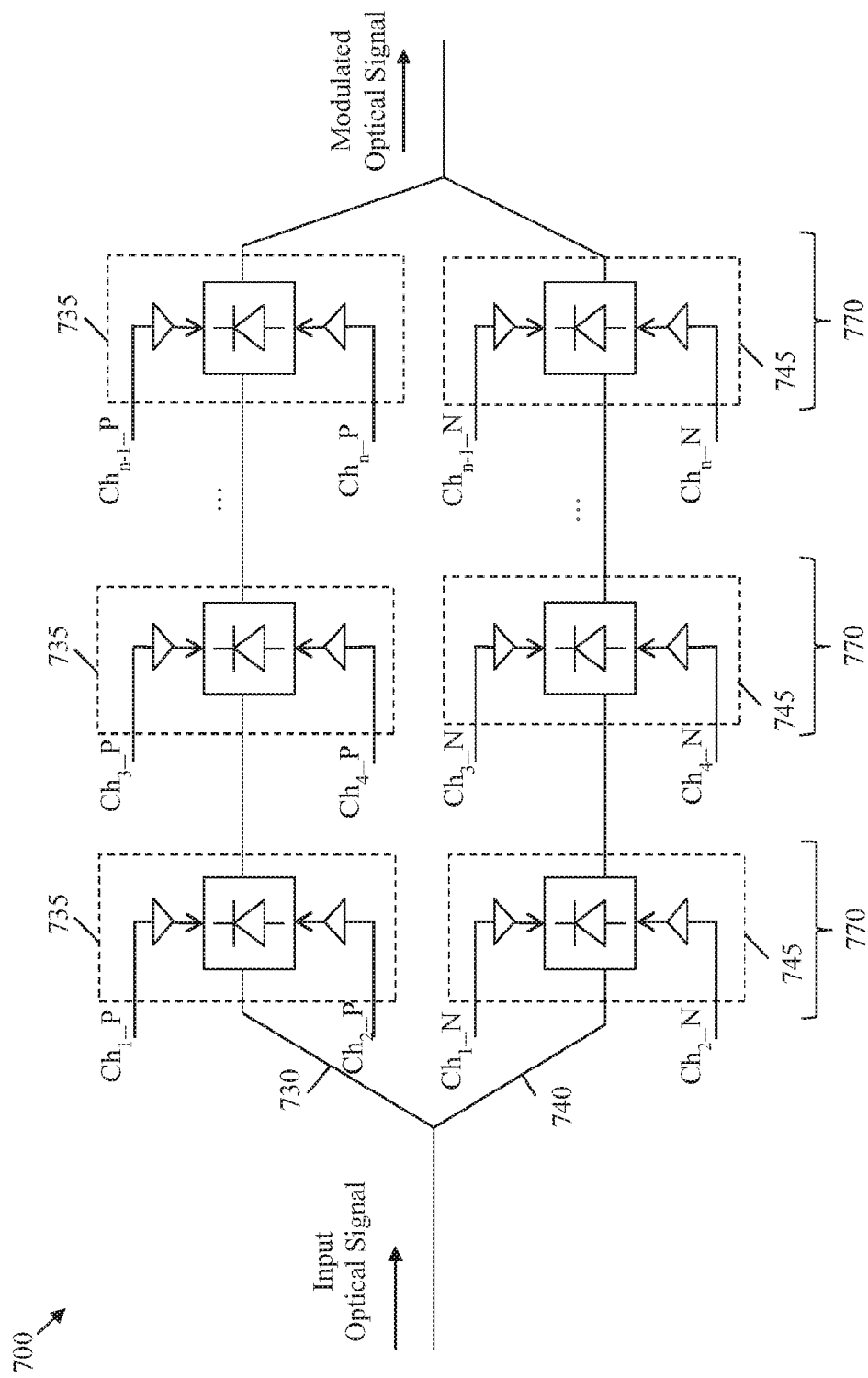
FIG. 7 is a schematic diagram of a segmented MZM according to an embodiment of the disclosure.

FIG. 7 is a schematic diagram of a segmented MZM 700 according to an embodiment of the disclosure. The MZM 700 is based on the MZM 600, and multiple data streams are serially added to different segments 770 of the MZM 700 to produce a higher output data rate. The MZM 700 comprises a pair of MZI arms 730, 740 similar to the MZI arms 130, 140, 230, 240, 630, and 640. The pair of MZI arms 730 and 740 is segmented into a plurality of segments 770. Each segment 770 is driven by a modulator driver section 735 similar to the modulator driver sections 300, 635, and 645 at the MZI arm 730 and another modulator driver section 745 at the arm 740. The modulator driver section 735 in each segment 770 is driven by a different pair of the data streams, shown as $Ch_1\_P$, $Ch_2\_P$, $Ch_3\_P$, $Ch_4\_P$, ..., $Ch_{n-1}\_P$, $Ch_n\_P$. The modulator driver section 745 in each segment 770 is driven by the inverse of a corresponding pair of the data stream, shown as $Ch_1\_N$, $CH_2\_N$, $Ch_3\_N$, $Ch_4\_N$, ..., $Ch_{n-1}\_N$, $Ch_n\_N$. Since the segments 770 are positioned at varying lengths of the MZI arms 730 and 740, different segments 770 produce different amounts of phase shift. In operation, each segment 770 combines a pair of the data streams at a data bit rate of R into a single optical stream with a baud rate of R and a data bit rate of 2R. The modulation effect of all segments 770 are accumulated at the output of the MZM 700, where each modulation symbol represents a binary number with multiple binary digits. For example, data streams modulated by a segment 770 located at a shorter length from the input of the WI arms 730 and 740 may correspond to binary digits of lower significance than a segment 770 located at a longer length from the input of the MZI arms 730 and 740.

Figure 8:
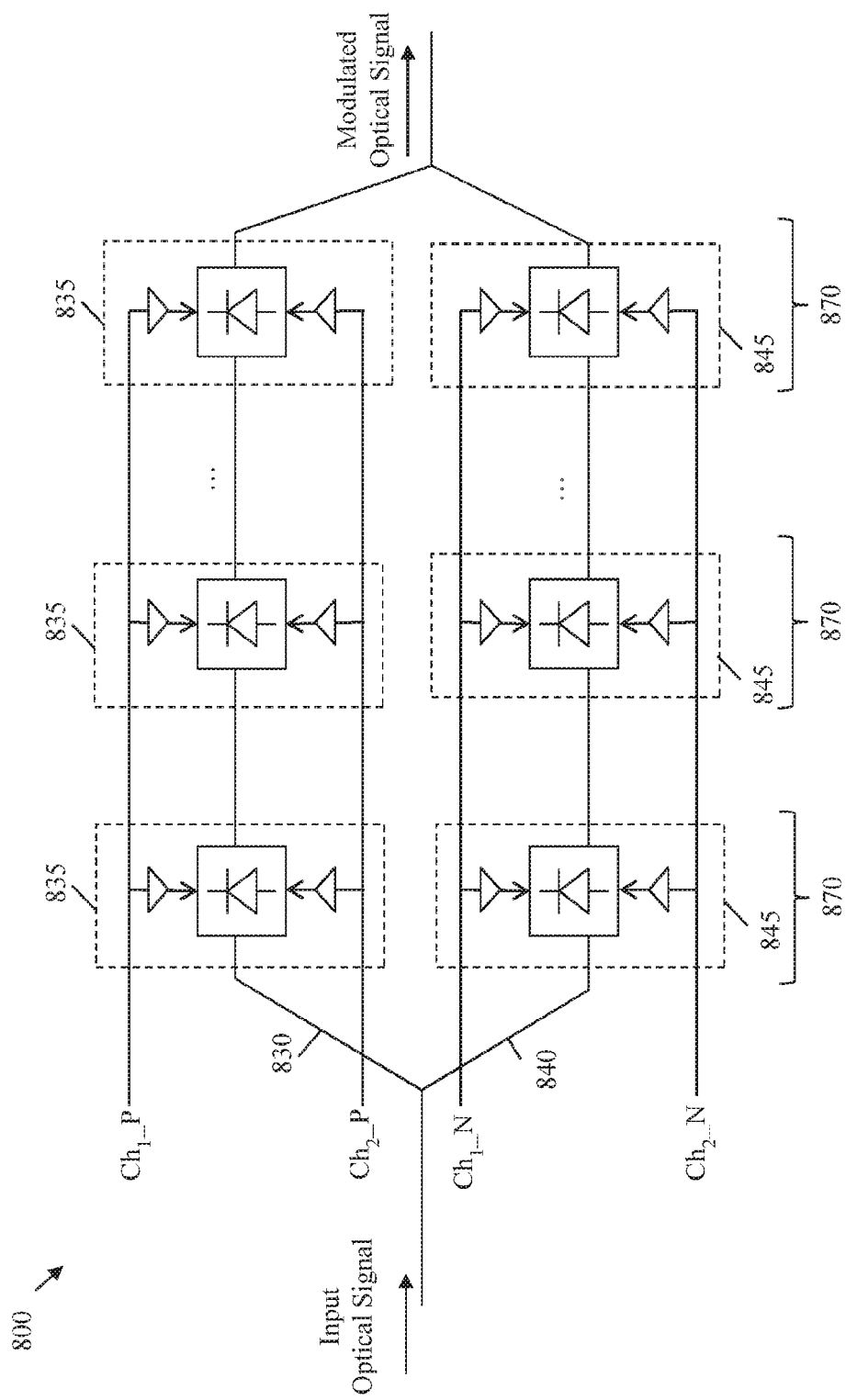
FIG. 8 is a schematic diagram of an MZM with a distributed modulator driver configuration according to an embodiment of the disclosure.

FIG. 8 is a schematic diagram of an MZM 800 with a distributed modulator driver configuration according to an embodiment of the disclosure. The MZM 800 is based on the MZM 600 and employs the distributed modulator driver configuration to increase bandwidth. The MZM 800 comprises a pair of MZI arms 830, 840 similar to the MZI arms 130, 140, 230, 240, 630, 640, 730, and 740. The pair of MZI arms 830 and 840 is segmented into a plurality of segments 870. Each segment 870 is driven by a modulator driver section 835 similar to the modulator driver sections 300, 635, 645, 735, and 745 at the MZI arm 830 and another modulator driver sections 845 at the MZI arm 840. The modulator driver section 835 are driven by a pair of data streams, shown as $Ch_1\_P$ and $Ch_2\_P$, with various delays, and the modulator driver section 845 are driven by the inverse of the data streams, shown as $Ch_1\_N$ and $Ch_2\_N$, with various corresponding delays. In operation, an optical signal propagating through the MZI arm 830 is modulated by successive modulator driver sections 835, and an optical signal propagating through the MZI arm 840 is modulated by successive modulator driver sections 845.

Figure 9:
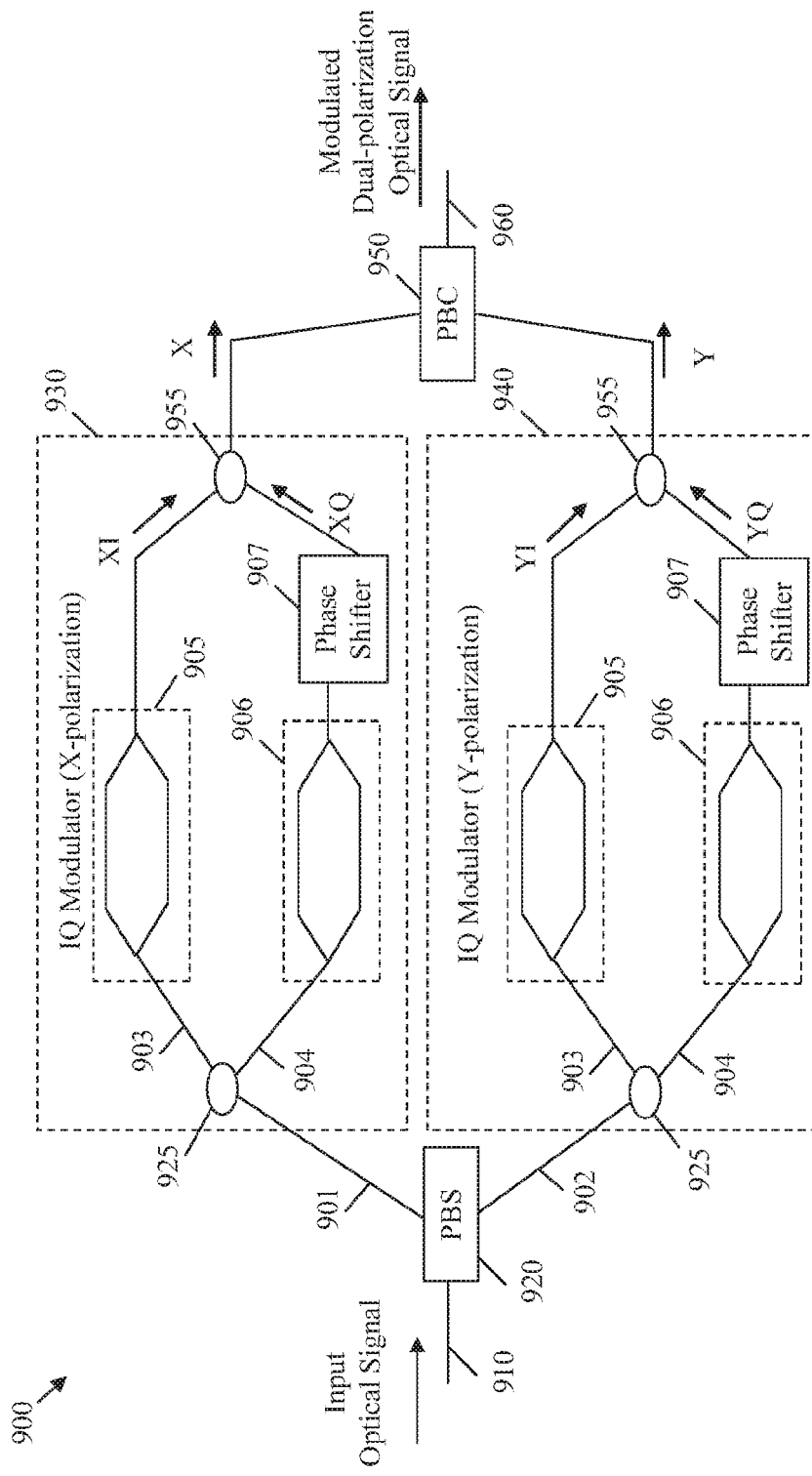
FIG. 9 is a schematic diagram of a dual-polarization 16 quadrature-amplitude modulation (DP-16QAM) modulator according to an embodiment of the disclosure.

FIG. 9 is a schematic diagram of a DP-16QAM optical modulator 900 according to embodiment of the disclosure. The modulator 900 is based on the MZM 600, and employs a nested MZM configuration to provide DP-16QAM. The modulator 900 comprises a pair of MZI arms 901, 902 coupled between an input waveguide 910 and an output waveguide 960 via a polarization beam splitter (PBS) 920 and a polarization beam combiner (PBC) 950, respectively. The MZI arms 901 and 902 are similar to the MZI arms 130, 140, 230, 240, 630, 640, 730, and 740. The input waveguide 910 and the output waveguide 960 are similar to the input waveguides 110, 210, 610, 710, and 810 and the output waveguides 160, 260, 660, 760, and 860. The PBS 920 is an optical device or component configured to split an optical signal into an X-polarization and a Y-polarization, where the X-polarization and the Y-polarization are orthogonal to each other. The PBC 950 is an optical device or component configured to combine an X-polarization component and a Y-polarization component into a single optical signal. The NM arm 901 comprises an IQ modulator 930. The MZI arm 902 comprises an IQ modulator 940. Each of the IQ modulators 930 and 940 comprises a pair of MZI arms 903, 904 similar to the MZI arms 130, 140, 230, 240, 630, 640, 730, and 740 coupled via an optical splitter 925 similar to the optical splitters 120 and 220 and an optical combiner 955 similar to the optical combiners 150 and 250. The MZI arm 903 comprises an MZM 905. The MZI arm 904 comprises an MZM 906 and a phase shifter 907. The MZMs 905 and 906 are similar to the MZM 600. Each of the MZMs 905 and 906 are configured to modulate two separate data streams by employing modulator driver sections such as the modulator driver sections 300, 635, 645, 735, 745, 835, and 845.

In operation, the input waveguide 910 is configured to receive an input optical signal. The PBS 920 splits the optical signal into an X-polarization component and a Y-polarization component. The PBS 920 couples the X-polarization component to the MZI arm 901 and the Y-polarization component to the MZI arm 902. The X-polarization component is modulated by the IQ modulator 930 and the Y-polarization component is modulated by the IQ modulator 940.

At each of the IQ modulators 930 and 940, the optical splitter 925 splits an input optical signal, which may be an X-polarization component or a Y-polarization component, into two portions and couples a first portion to the MZI arm 903 and a second portion to the MZI arm 904. The MZM 905 modulates a pair of data streams onto the phase of the first optical signal portion to produce an I component with four distinct levels. The MZM 906 modulates another pair of data streams onto the phase of the second optical signal portion to produce a modulated optical signal with four distinct levels. The phase shifter 943 applies an additional optical phase shift of $\pi/2$ radians to the modulated optical signal output by the MZM 906. Thus, the phase shifter 907 produces a Q component with four distinct levels. In the IQ modulator 930 for the X-polarization, the I and Q components are represented as XI and XQ, respectively. In the IQ modulator 940 for the Y-polarization, the I and Q components are represented as YI and YQ, respectively. The optical combiner 955 combines the I component and the Q component in each polarization to produce a 16QAM signal. The X-polarization component, shown as X, and the Y-polarization component, shown as Y, are combined by the PBC 950 to produce a dual-polarization modulated optical signal. As shown, the modulator 900 generates DP-16QAM without employing any DAC, linear driver, or other external device. Thus, the disclosed embodiments reduce power consumption, cost, size, and optical loss.

Figure 10A:
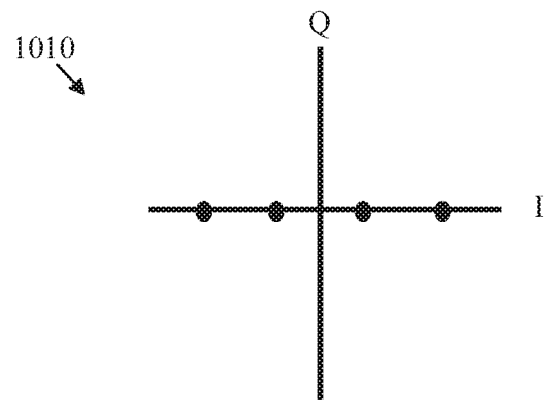
FIG. 10A is a constellation diagram of an I component generated by an IQ modulator according to an embodiment of the disclosure.
Figure 10B:
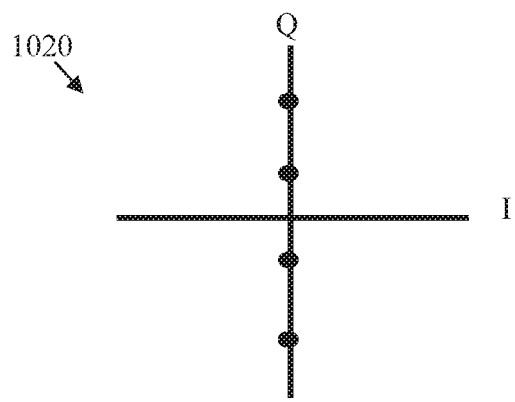
FIG. 10B is a constellation diagram of a Q component generated by an IQ modulator according to an embodiment of the disclosure.
Figure 10C:
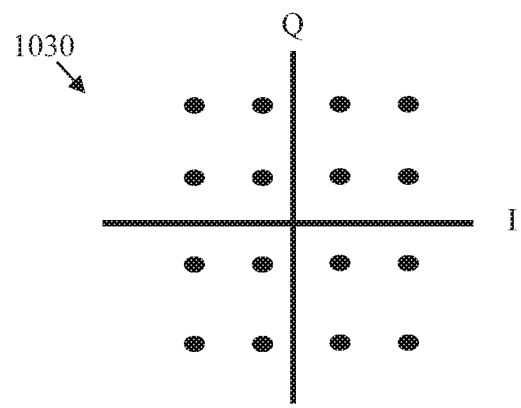
FIG. 10C is a constellation diagram of an output signal generated by an IQ modulator according to an embodiment of the disclosure

FIGS. 10A-C illustrate constellations generated by the modulator 900. The x-axis represents I components and the y-axis represents Q components. FIG. 10A is a constellation diagram 1010 of an I component generated by the IQ modulators 920 and 930 according to an embodiment of the disclosure. For example, the I component corresponds to the I components XI and YI in FIG. 9. FIG. 10B is a constellation diagram 1020 of a Q component generated by the IQ modulators 920 and 930 according to another embodiment of the disclosure. For example, the Q component corresponds to the Q components XQ and YQ in FIG. 9. FIG. 10C is a constellation diagram 1030 of an output signal generated by the IQ modulators 920 and 930 according to an embodiment of the disclosure. For example, the output corresponds to the X-polarization component X and the Y-polarization component Y in FIG. 9.

Figure 11:
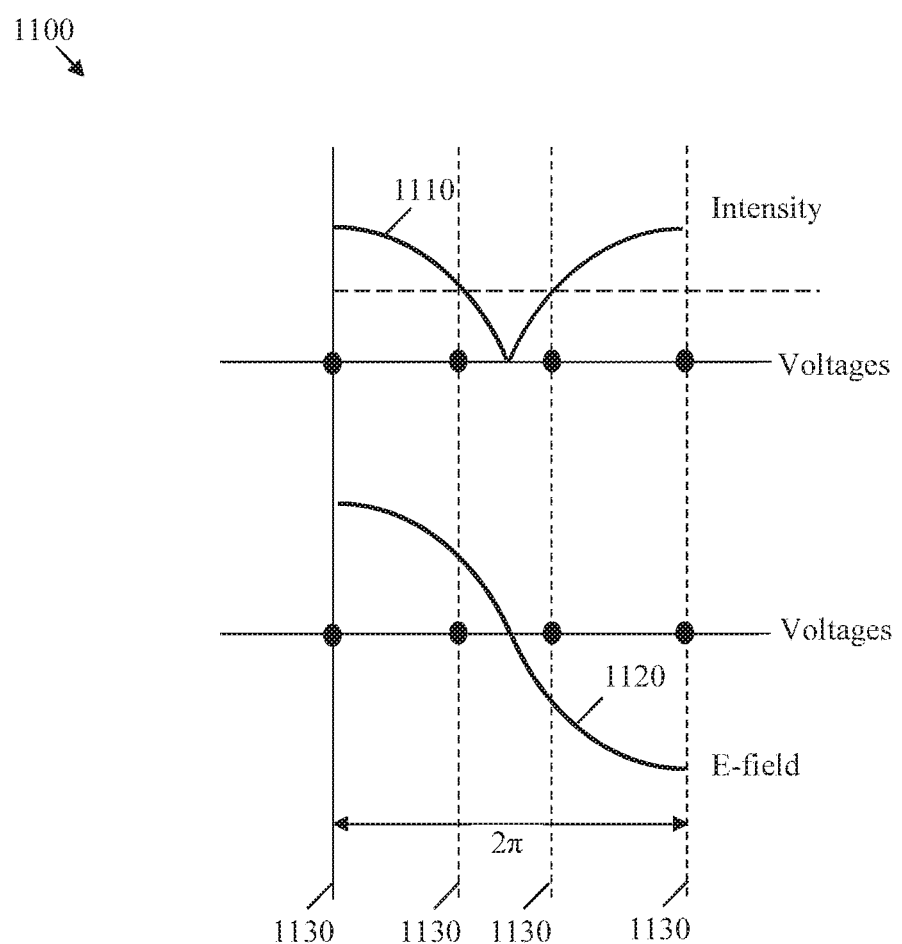
FIG. 11 is a graph illustrating intensity and electric (E)-field at a Mach-Zehnder interferometer (MZI) arm segment according to an embodiment of the disclosure.

FIG. 11 is a graph 1100 illustrating intensity and E-field at an MZI arm segment such as the MZI arms 230, 340, 630, 640, 730, 740, 830, 840, 901, 902, 903, and 904 according to an embodiment of the disclosure. The x-axis represents voltages in units of V. The plot 1110 shows the optical intensity in some constant units as a function of voltage. The plot 1120 shows the E-field in some constant units as a function of voltages. The lines 1130 show the four distinct voltage levels produced by a modulator driver section such as the modulator driver sections 300, 635, 645, 735, 745, 835, and 845. The four distinct voltage levels swing over full phase shift of 2π, where each voltage level corresponds to a particular phase shift. As shown, the four voltage levels are unevenly spaced. The uneven voltage steps are selected to provide high modulation linearity or better constellation spacing and high intensity. Thus, the disclosed embodiments may be employed to overcome the non-linearity in 16QAM produced by typical MZMs.

Figure 12:
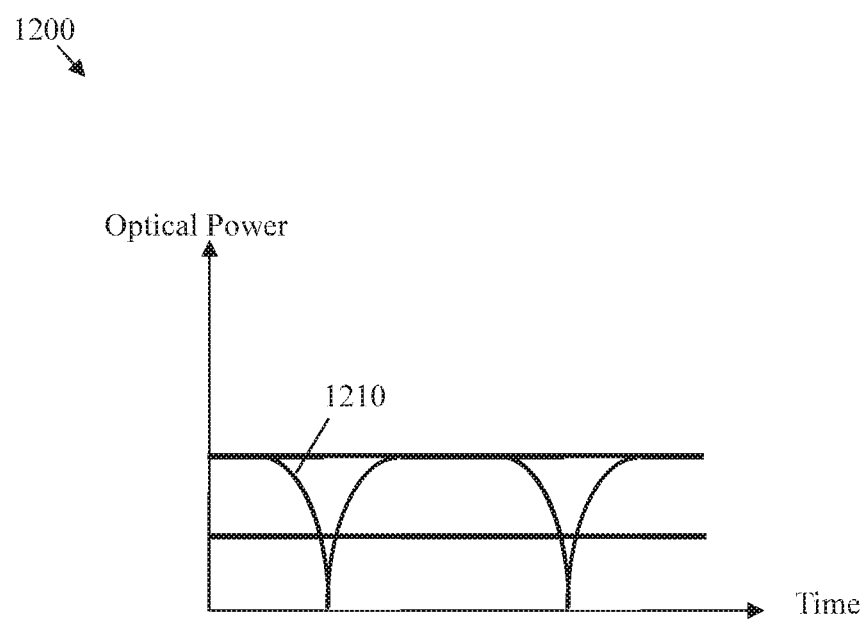
FIG. 12 is a graph illustrating an eye diagram of a demodulated optical signal according to an embodiment of the disclosure

FIG. 12 is a graph 1200 illustrating an eye diagram 1200 of a demodulated optical signal according to an embodiment of the disclosure. The optical signal is generated by an MZM such as the MZMs 200, 600, 700, 800, and 900 by employing uneven modulation voltage steps as shown in the graph 1100. The x-axis represents time in some constant units. The y-axis represents optical power in some constant units. The eye diagram 1210 is generated after demodulating the optical signal. The eye diagram 1210 comprises an evenly-shaped optical eye. Thus, assigning voltages appropriately according to the design of the MZM achieve an evenly-shaped optical eye and improved performance.

Figure 13:
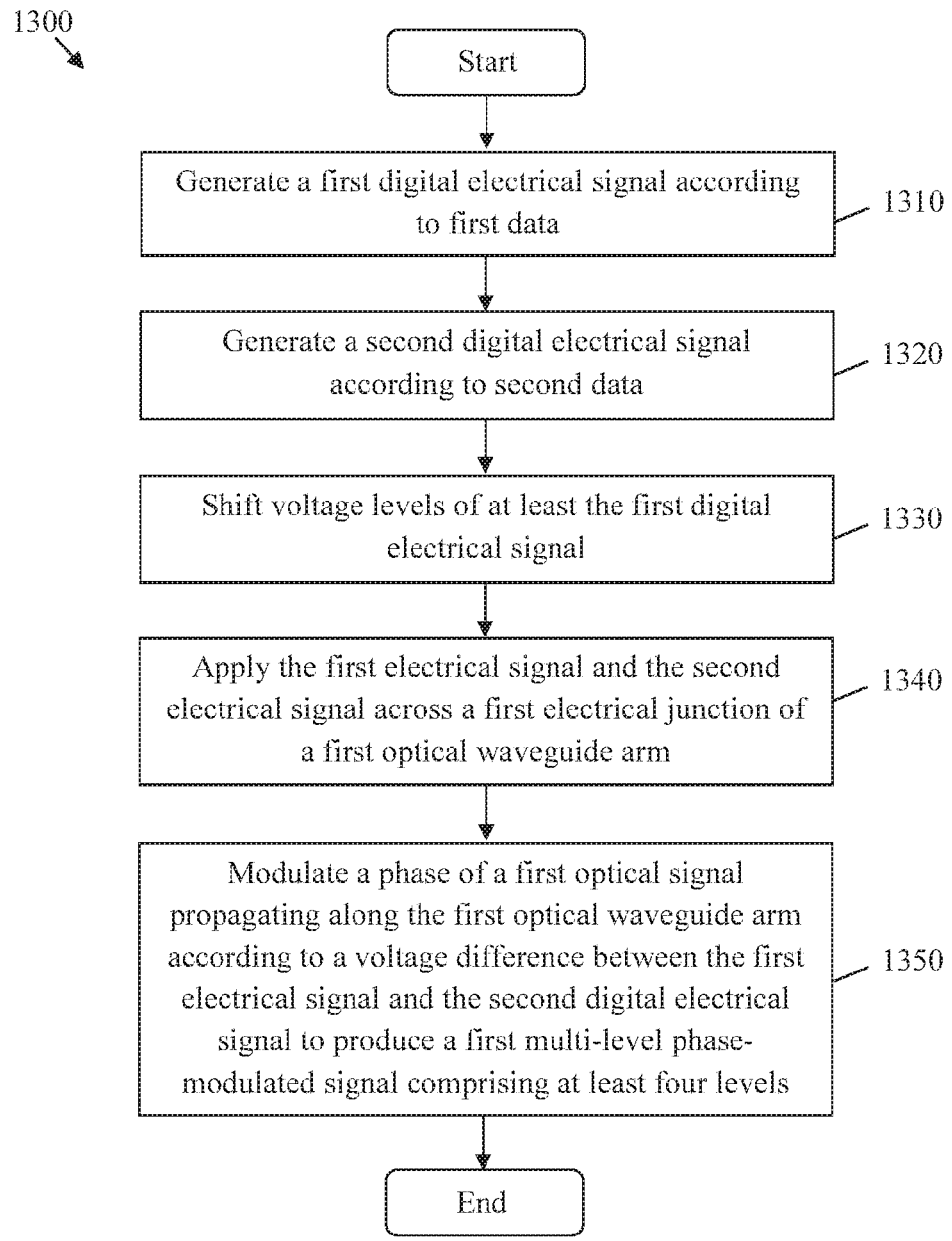
FIG. 13 is a flowchart of a method for generating a multi-level phase-shifted signal according to an embodiment of the disclosure.

FIG. 13 is a flowchart of a method 1300 for generating a multi-level phase-shifted signal according to an embodiment of the disclosure. The method 1300 is implemented by an MZM such as the MZMs 200, 600, 700, 800, and 900. The method 1300 is implemented when modulating data information for optical transmission. At step 1310, a first digital electrical signal is generated according to first data. At step 1320, a second digital electrical signal is generated according to second data. For example, the first electrical signal and the second electrical signal are each generated by an electrical driver such as the CMOS drivers 310, 320, 631, 632, 641, and 642. The first electrical signal and the second electrical signal may be binary voltage signals comprising different voltage swings. For example, the first electrical signal may comprise a waveform similar to the waveform 411 and the second electrical signal may comprise a waveform similar to the waveform 412. The first data and the second data are uncorrelated data. For example, the first data and the second data may be from different data streams.

At step 1330, voltage levels of at least the first digital electrical signal is shifted by a voltage level shifter similar to the level shifter 500. At step 1340, the first electrical signal and the second electrical signal are applied across a first electrical junction of a first optical waveguide arm as shown in the modulator driver section 300 and the MZM 600. For example, the voltage levels of the first digital electrical signal may be shifted to provide a voltage difference with staggered voltage steps across the first electrical junction as shown in the waveform 421. At step 1350, a phase of a first optical signal propagating along the first optical waveguide arm is modulated according to the voltage difference between the first electrical signal and the second digital electrical signal to produce a first multi-level phase-modulated signal comprising at least four levels. For example, the first multi-level phase-modulated signal may comprise a constellation similar to the constellation diagram 1010.

Figure 14:
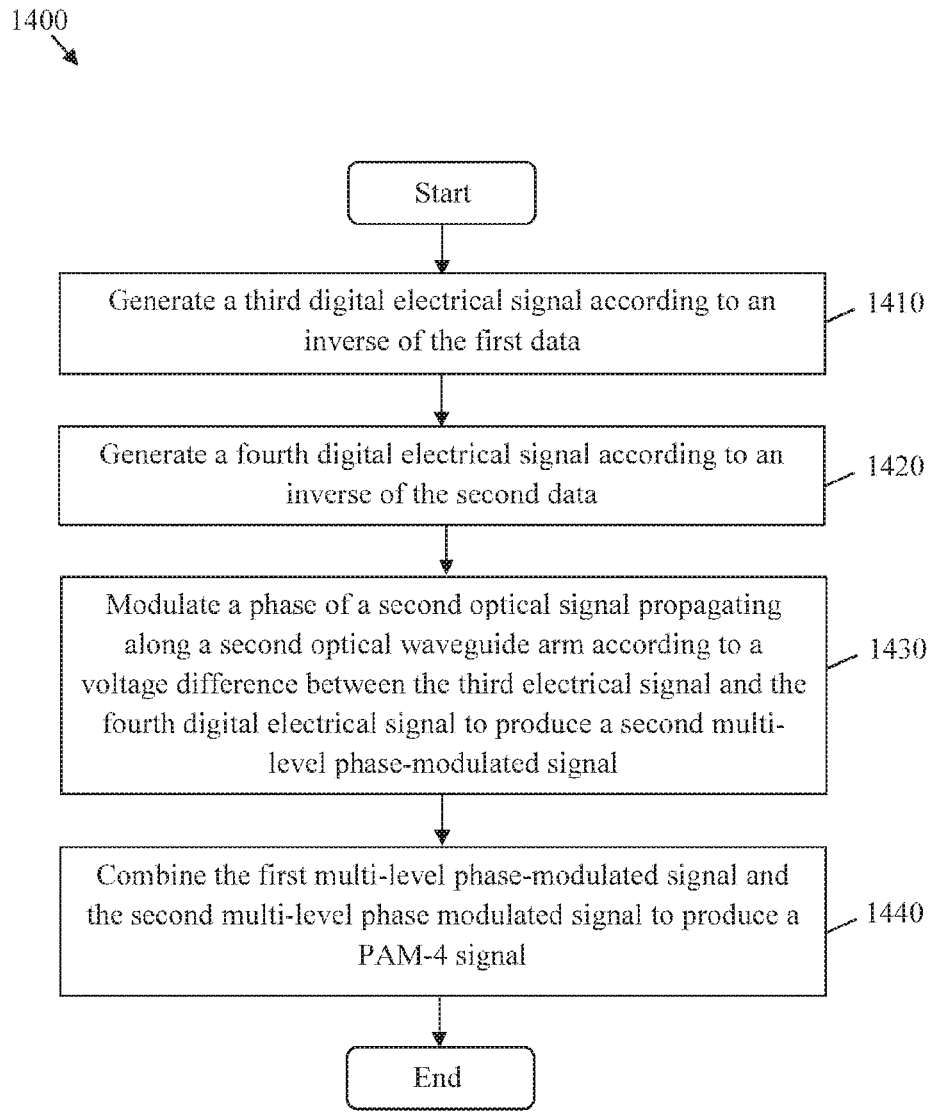
FIG. 14 is a flowchart of a method for generating a multi-level phase-shifted signal with an increased modulation depth according to an embodiment of the disclosure.

FIG. 14 is a flowchart of a method 1400 for generating a multi-level phase-shifted signal with an increased modulation depth according to an embodiment of the disclosure. The method 1400 is implemented by an MZM such as the MZMs 200, 600, 700, 800, and 900. The method 1400 is implemented in conjunction with the method 1300. At step 1410, a third digital electrical signal is generated according to an inverse of the first data. The third digital electrical signal and the first digital electrical signal comprise opposite polarities. At step 1420, a fourth digital electrical signal is generated according to an inverse of the second data. The fourth digital electrical signal and the second digital electrical signal comprise opposite polarities. At step 1430, a phase of a second optical signal propagating along a second optical waveguide arm is modulated according to a voltage difference between the third electrical signal and the fourth digital electrical signal to produce a second multi-level phase-modulated signal. For example, the first optical waveguide arm and the second waveguide arm are positioned in parallel with each other in a configuration similar to the MZI arms 630 and 640 shown in the MZM 600. At step 1440, the first multi-level phase-modulated signal and the second multi-level phase modulated signal are combined to produce a PAM-4 signal. By biasing the first optical waveguide arm and the second optical waveguide arms with voltages of opposite polarities, the PAM-4 signal may comprise a greater modulation depth.

Figure 15:
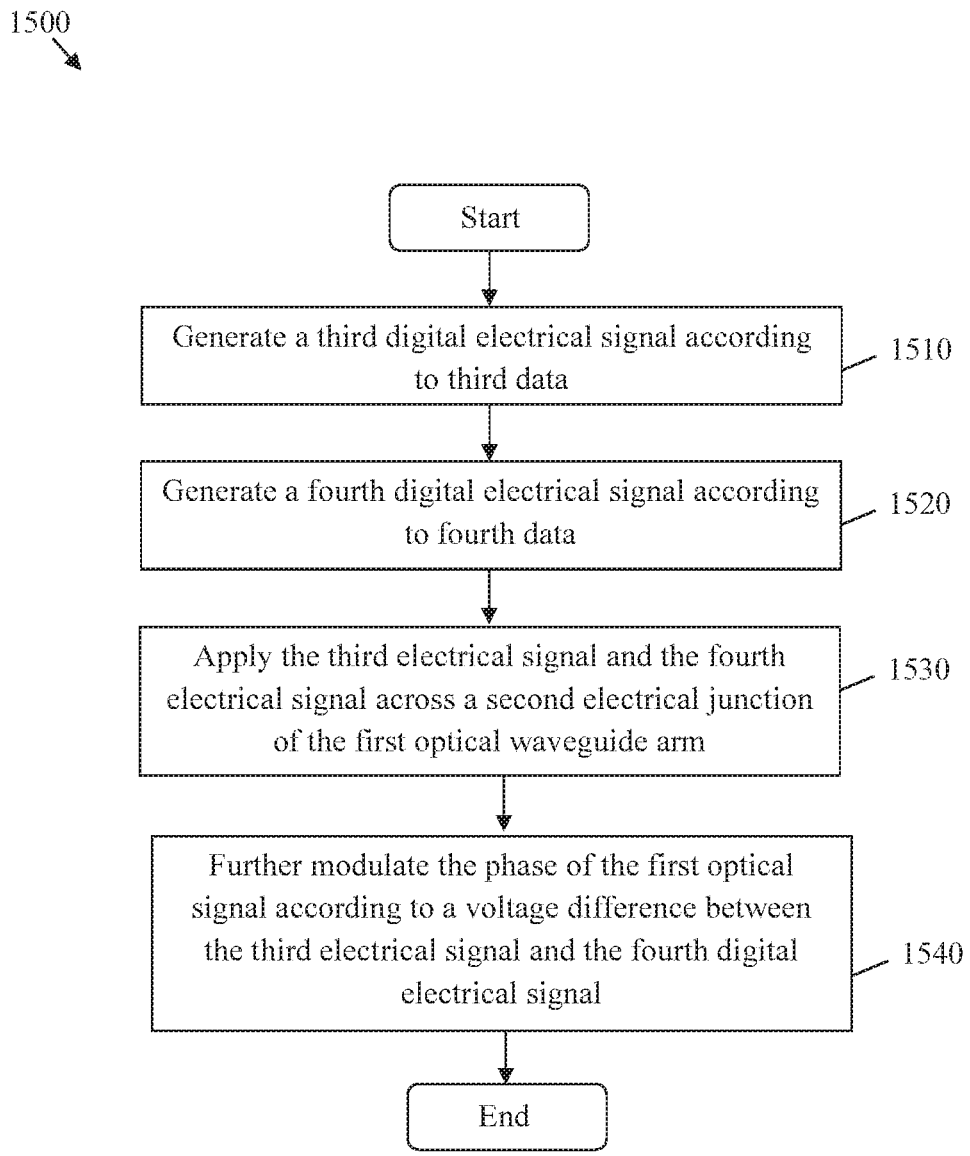
FIG. 15 is a flowchart of a method for generating a multi-level phase-shifted signal with an increased output data rate according to an embodiment of the disclosure.

FIG. 15 is a flowchart of a method 1500 for generating a multi-level phase-shifted signal with an increased output data rate according to an embodiment of the disclosure. The method 1500 is implemented by an MZM such as the MZM 700. The method 1500 is implemented in conjunction with the method 1300. At step 1510, a third digital electrical signal is generated according to third data. At step 1520, a fourth digital electrical signal is generated according to fourth data. The first data, second data, third data, and fourth data are different data. At step 1530, the third electrical signal and the fourth electrical signal are applied across a second electrical junction of the first optical waveguide arm. For example, the first optical waveguide arm may comprise a plurality of segments such as the segments 770, where the first electrical junction is at a first segment and the second electrical junction is at a second segment. At step 1540, the phase of the first optical signal is further modulated according to a voltage difference between the third electrical signal and the fourth digital electrical signal. The modulation effect produced by the first data, the second data, the third data, and the fourth data is accumulated as the first optical signal propagates along the first optical waveguide arm to produce a high aggregate output data rate.

Figure 16:
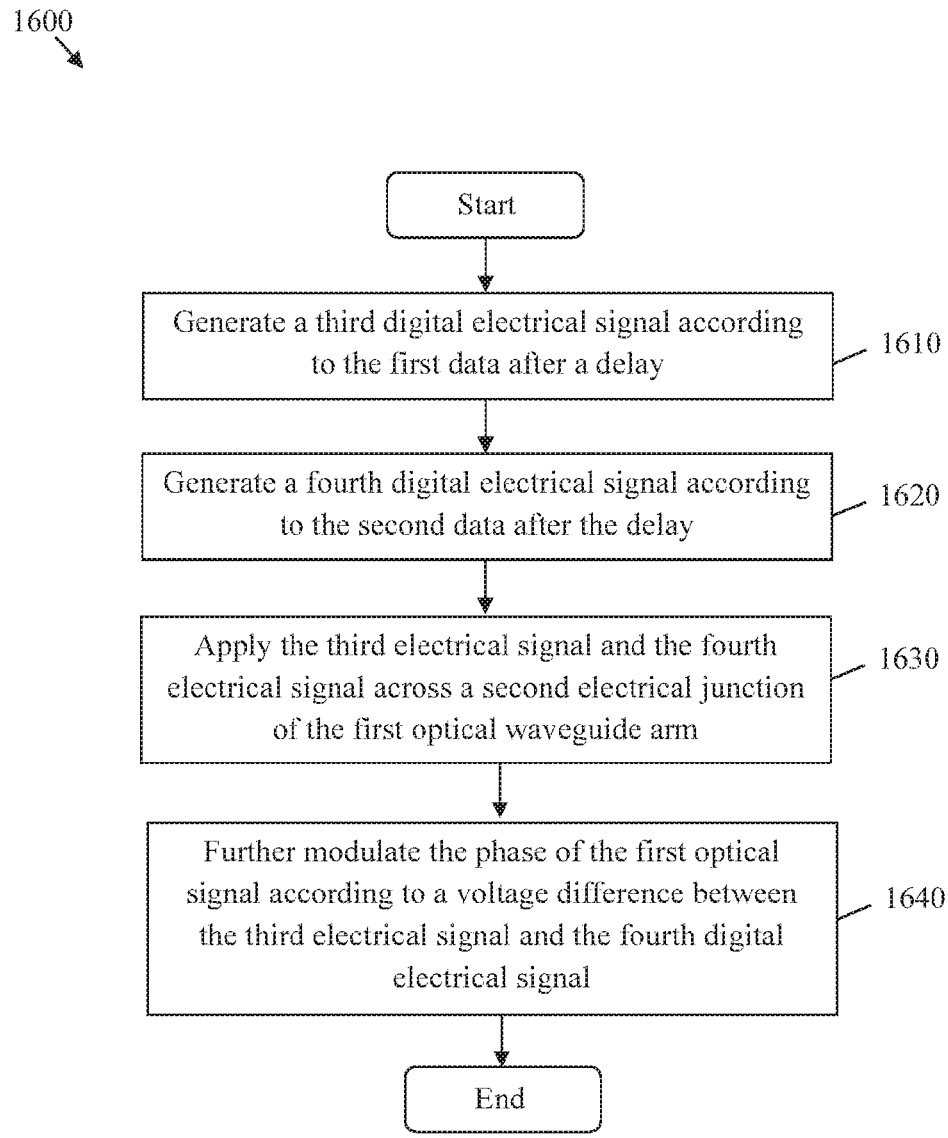
FIG. 16 is a flowchart of a method for generating a multi-level phase-shifted signal with an increased output bandwidth according to an embodiment of the disclosure.

FIG. 16 is a flowchart of a method 1600 for generating a multi-level phase-shifted signal with an increased output bandwidth according to an embodiment of the disclosure. The method 1600 is implemented by an MZM such as the MZM 800. The method 1600 is implemented in conjunction with the method 1300. At step 1610, a third digital electrical signal is generated according to the first data after a delay. At step 1620, a fourth digital electrical signal is generated according to the second data after the delay. At step 1630, the third electrical signal and the fourth electrical signal are applied across a second electrical junction of the first optical waveguide arm. For example, the first optical waveguide arm may comprise a plurality of segments such as the segments 870, where the first electrical junction is at a first segment and the second electrical junction is at a second segment. At step 1640, the phase of the first optical signal is further modulated according to a voltage difference between the third electrical signal and the fourth digital electrical signal.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first electrical driver configured to generate a first binary voltage signal according to first data;
a second electrical driver configured to generate a second binary voltage signal according to second data, wherein the first data and the second data are different; and
a first optical waveguide arm coupled to the first electrical driver and the second electrical driver,
wherein the first optical waveguide arm is configured to shift a first phase of a first optical signal propagating along the first optical waveguide arm according to a first voltage difference between the first binary voltage signal and the second binary voltage signal to produce a first multi-level phase-shifted optical signal.

2. The apparatus of claim 1, wherein the first electrical driver is further configured to provide a first voltage swing for the first binary voltage signal, wherein the second electrical driver is further configured to provide a second voltage swing for the second binary voltage signal, wherein the first voltage swing is different from the second voltage swing, and wherein the first multi-level phase-shifted optical signal comprises at least four signal levels.

3. The apparatus of claim 2, further comprising a level shifter coupled to the first electrical driver and configured to shift voltage levels of the first binary voltage signal so that the first voltage difference comprises at least four voltage steps.

4. The apparatus of claim 1, wherein the first electrical driver and the second electrical driver are complementary metal-oxide semiconductor (CMOS) drivers.

5. The apparatus of claim 1, wherein the first binary voltage signal and the second binary voltage signal comprise synchronized bit transitions.

6. The apparatus of claim 1, wherein the first optical waveguide arm comprises a plurality of segments along an optical path, wherein the first electrical driver and the second electrical driver are positioned at a first segment of the plurality of segments, wherein the apparatus further comprises:
a third electrical driver coupled to the first optical waveguide arm at a second segment of the plurality of segments, wherein the third electrical driver is configured to generate a third binary voltage signal according to third data; and
a fourth electrical driver coupled to the first optical waveguide arm at the second segment, wherein the fourth electrical driver is configured to generate a fourth binary voltage signal according to fourth data, wherein the first data, the second data, the third data, and the fourth data are different, and
wherein the first optical waveguide arm is further configured to shift the first phase according to a second voltage difference between the third binary voltage signal and the fourth binary voltage signal.

7. The apparatus of claim 1, wherein the first optical waveguide arm comprises a plurality of segments along an optical path, wherein the first electrical driver and the second electrical driver are positioned at a first segment of the plurality of segments, wherein the apparatus further comprises:
a third electrical driver coupled to the first optical waveguide arm at a second segment of the plurality of segments, wherein the third electrical driver is configured to generate a third binary voltage signal according to the first data after a delay; and
a fourth electrical driver coupled to the first optical waveguide arm at the second segment, wherein the fourth electrical driver is configured to generate a fourth binary voltage signal according to the second data after the delay, and
wherein the first optical waveguide arm is further configured to shift the first phase according to a second voltage difference between the third binary voltage signal and the fourth binary voltage signal.

8. The apparatus of claim 1, further comprising a first Mach-Zehnder modulator (MZM), wherein the first electrical driver, the second electrical driver, and the first optical waveguide arm are part of the first MZM.

9. The apparatus of claim 8, wherein the first MZM further comprises:
a first optical splitter coupled to the first optical waveguide arm and configured to split a third optical signal into the first optical signal and a second optical signal;

a second optical waveguide arm coupled to the first optical splitter and configured to shift a second phase of the second optical signal according to an inverse of the first data and an inverse of the second data to produce a second multi-level phase-shifted optical signal; and a first optical combiner coupled to the first optical waveguide arm and the second optical waveguide arm and configured to combine the first multi-level phase-shifted optical signal and the second multi-level phase-shifted optical signal to produce a first pulse-amplitude modulation (PAM) signal comprising at least four levels.

10. The apparatus of claim 9, further comprising an in-phase quadrature-phase (IQ) modulator, wherein the first MZM is part of the IQ modulator, and wherein the first PAM signal corresponds to an in-phase (I) component.

11. The apparatus of claim 10, wherein the IQ modulator further comprises:
a second optical splitter coupled to the first MZM and configured to split a fourth optical signal into the third optical signal and a fifth optical signal;
a second MZM coupled to the second optical splitter, wherein the second MZM is configured to modulate the fifth optical signal according to third data and fourth data to produce a second PAM optical signal;
a phase shifter coupled to the second MZM and configured to shift a phase of the second PAM optical signal by pi ($\pi$)/2 radians to produce a quadrature-phase (Q) component; and
a second optical combiner coupled to the first MZM and the phase shifter, wherein the second optical combiner is configured to combine the I component and the Q component to produce a first 16 quadrature-amplitude modulation (16QAM) signal.

12. A method comprising:
generating a first binary voltage signal according to first data;
generating a second binary voltage signal according to second data, wherein the first data and the second data are different; and
shifting a first phase of a first optical signal propagating along a first optical waveguide arm according to a first voltage difference between the first binary voltage signal and the second binary voltage signal to produce a first multi-level phase-shifted optical signal.

13. The method of claim 12, further comprising:
providing a first voltage swing for the first binary voltage signal; and
providing a second voltage swing for the second binary voltage signal,
wherein the second voltage swing is different from the first voltage swing, and
wherein the first multi-level phase-shifted optical signal comprises at least four signal levels.

14. The method of claim 13, further comprising shifting voltage levels of the first binary voltage signal so that the first voltage difference comprises at least four voltage steps.

15. The method of claim 12, wherein the first binary voltage signal and the second binary voltage signal comprise synchronized bit transitions.

16. The method of claim 12, further comprising:
generating a third binary voltage signal according to third data;
generating a fourth binary voltage signal according to fourth data, wherein the first data, the second data, the third data, and the fourth data are different; and
shifting the first phase according to a second voltage difference between the third binary voltage signal and the fourth binary voltage signal.

17. The method of claim 12, further comprising:
generating a third binary voltage signal according to the first data after a delay;
generating a fourth binary voltage signal according to the second data after the delay; and
shifting the first phase according to a second voltage difference between the third binary voltage signal and the fourth binary voltage signal.

18. The method of claim 12, further comprising:
splitting a third optical signal into the first optical signal and a second optical signal;
shifting a second phase of the second optical signal according to an inverse of the first data and an inverse of the second data to produce a second multi-level phase-shifted optical signal; and
combining the first multi-level phase-shifted optical signal and the second multi-level phase-shifted optical signal to produce a first pulse-amplitude modulation (PAM) signal comprising at least four levels.

19. The method of claim 18, wherein the first PAM signal corresponds to an in-phase (I) component.

20. The method of claim 19, further comprising:
splitting a fourth optical signal into the third optical signal and a fifth optical signal;
modulating the fifth optical signal according to third data and fourth data to produce a second PAM optical signal;
shifting a phase of the second PAM optical signal by pi ($\pi$)/2 radians to produce a quadrature-phase (Q) component; and
combining the I component and the Q component to produce a first 16 quadrature-amplitude modulation (16QAM) signal.

* * * * *